US012634126B1

(12) United States Patent
Yeoh et al.

(10) Patent No.: US 12,634,126 B1
(45) Date of Patent: May 19, 2026

(54) DISCOVERY AND ATTESTATION OF HARDWARE SECURITY MODULES

(71) Applicant: Amazon Technologies, Inc., Reno, NV (US)

(72) Inventors: SengMing Yeoh, Arlington, VA (US); Graeme Farquharson, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 351 days.

(21) Appl. No.: 18/193,089

(22) Filed: Mar. 30, 2023

(51) Int. Cl.
*H04L 9/08* (2006.01)
*H04L 9/40* (2022.01)

(52) U.S. Cl.
CPC ............ *H04L 9/0877* (2013.01); *H04L 63/08* (2013.01)

(58) Field of Classification Search
CPC .............................. H04L 9/0877; H04L 63/08
See application file for complete search history.

(56) References Cited

U.S. PATENT DOCUMENTS

| | | | | |
|---|---|---|---|---|
| 8,544,092 | B2 * | 9/2013 | Hermann | G06F 21/57 726/25 |
| 8,572,368 | B1 * | 10/2013 | Deacon | G06F 21/64 713/158 |
| 9,135,444 | B2 * | 9/2015 | Carter | G06F 21/33 |
| 9,438,421 | B1 * | 9/2016 | Roth | H04L 9/088 |
| 9,584,325 | B1 * | 2/2017 | Brandwine | H04L 63/0272 |
| 9,660,970 | B1 * | 5/2017 | Rubin | H04L 9/0891 |
| 9,906,493 | B1 * | 2/2018 | Rodgers | H04L 61/5007 |
| 9,992,029 | B1 * | 6/2018 | Jackson | H04L 63/0428 |
| 10,311,240 | B1 * | 6/2019 | Nissler | H04L 63/0428 |
| 10,425,225 | B1 * | 9/2019 | Grubin | H04L 9/0643 |
| 10,461,943 | B1 * | 10/2019 | Norum | H04L 63/0823 |
| 10,778,429 | B1 * | 9/2020 | Rubin | H04L 9/0897 |
| 11,811,729 | B1 * | 11/2023 | Sharma | H04L 61/5038 |
| 12,095,909 | B1 * | 9/2024 | Campagna | H04L 9/0822 |
| 12,126,713 | B1 * | 10/2024 | Ramanathan | H04L 9/0861 |
| 12,278,799 | B2 * | 4/2025 | Kim | H04L 45/74 |
| 12,355,783 | B2 * | 7/2025 | Klawe | G06Q 20/202 |
| 2005/0251857 | A1 * | 11/2005 | Schunter | G06F 21/57 726/16 |
| 2005/0268103 | A1 * | 12/2005 | Camenisch | H04L 9/3234 713/176 |
| 2005/0289347 | A1 * | 12/2005 | Ovadia | H04L 9/3247 713/171 |

(Continued)

*Primary Examiner* — Aravind K Moorthy
(74) *Attorney, Agent, or Firm* — Hogan Lovells US LLP

(57) ABSTRACT

Approaches presented herein relate to the providing of cryptographic-related functionality using shared computing resources. A fleet of hardware security modules (HSMs) can be similarly configured such that requests to perform cryptography-related tasks can be routed to any of the HSMs in the fleet. Additional HSMs can be connected, and those HSMs can be automatically discovered and authenticated, such as by requesting responses to challenge questions along with identifying information such as an expected serial number. Once a server can attest to the HSM as a trusted resource, a provisioning workflow can be initiated to configure the HSM and provide the appropriate keys so the HSM can be routed requests as part of the fleet. Multiple users may then have requests processed by the fleet as part of a security-related service offering.

20 Claims, 7 Drawing Sheets

(56)         References Cited

U.S. PATENT DOCUMENTS

| | | | |
|---|---|---|---|
| 2006/0026325 A1* | 2/2006 | Huang | H04L 61/5038 |
| | | | 710/302 |
| 2008/0319779 A1* | 12/2008 | Hughes | G06Q 99/00 |
| | | | 705/310 |
| 2009/0214040 A1* | 8/2009 | Funk | H04L 9/088 |
| | | | 380/277 |
| 2009/0300348 A1* | 12/2009 | Aciicmez | H04L 63/08 |
| | | | 713/156 |
| 2011/0055559 A1* | 3/2011 | Li | G06F 21/6218 |
| | | | 380/259 |
| 2011/0292947 A1* | 12/2011 | Vobbilisetty | H04L 49/252 |
| | | | 370/397 |
| 2011/0296230 A1* | 12/2011 | Chen | H04L 49/557 |
| | | | 714/E11.078 |
| 2012/0140923 A1* | 6/2012 | Lee | H04L 9/0894 |
| | | | 380/44 |
| 2013/0166754 A1* | 6/2013 | Christenson | H04L 61/50 |
| | | | 709/226 |
| 2013/0212387 A1* | 8/2013 | Oberheide | H04L 9/32 |
| | | | 713/168 |
| 2014/0006776 A1* | 1/2014 | Scott-Nash | G06F 21/57 |
| | | | 713/189 |
| 2014/0033310 A1* | 1/2014 | Cheng | H04L 63/1416 |
| | | | 726/23 |
| 2014/0283098 A1* | 9/2014 | Phegade | H04L 63/0428 |
| | | | 726/26 |
| 2014/0289528 A1* | 9/2014 | Baghdasaryan | H04L 9/3297 |
| | | | 713/171 |
| 2015/0149776 A1* | 5/2015 | Chastain | H04L 63/061 |
| | | | 713/168 |
| 2015/0271150 A1* | 9/2015 | Barnett | G06F 21/44 |
| | | | 713/171 |
| 2015/0281966 A1* | 10/2015 | Griot | H04W 12/06 |
| | | | 726/5 |
| 2015/0382195 A1* | 12/2015 | Grim | H04W 12/06 |
| | | | 726/4 |
| 2016/0050563 A1* | 2/2016 | Bronk | H04L 63/062 |
| | | | 726/7 |
| 2016/0142212 A1* | 5/2016 | Sarangdhar | H04L 9/3234 |
| | | | 713/156 |
| 2016/0285875 A1* | 9/2016 | Lenz | H04L 63/10 |
| 2016/0315768 A1* | 10/2016 | Fu | H04L 63/06 |
| 2016/0315907 A1* | 10/2016 | Nantel | H04L 61/5014 |
| 2017/0155513 A1* | 6/2017 | Acar | G06Q 20/20 |
| 2017/0250814 A1* | 8/2017 | Brickell | H04W 12/37 |
| 2017/0257365 A1* | 9/2017 | Gonzalez | H04L 63/0876 |
| 2017/0317969 A1* | 11/2017 | Masurekar | H04L 61/5061 |
| 2017/0339561 A1* | 11/2017 | Wennemyr | H04L 67/125 |
| 2017/0366520 A1* | 12/2017 | Templin | H04L 9/0847 |
| 2018/0007125 A1* | 1/2018 | Onno | H04L 41/0895 |
| 2018/0034626 A1* | 2/2018 | Yamada | G06F 16/24553 |
| 2018/0101847 A1* | 4/2018 | Pisut, IV | G06Q 20/40145 |
| 2018/0114000 A1* | 4/2018 | Taylor | H04L 9/0643 |
| 2018/0167203 A1* | 6/2018 | Belenko | H04L 9/14 |
| 2018/0181756 A1* | 6/2018 | Campagna | H04L 9/088 |
| 2018/0234255 A1* | 8/2018 | Fu | H04L 9/30 |
| 2018/0248743 A1* | 8/2018 | Chandrashekhar | H04L 41/046 |

| | | | |
|---|---|---|---|
| 2019/0020647 A1* | 1/2019 | Sinha | H04L 63/061 |
| 2019/0065733 A1* | 2/2019 | Forehand | H04L 9/32 |
| 2019/0140828 A1* | 5/2019 | Wheeler | H04L 9/3242 |
| 2019/0149539 A1* | 5/2019 | Scruby | H04L 63/083 |
| | | | 713/168 |
| 2019/0238517 A1* | 8/2019 | D'Agostino | H04L 63/0428 |
| 2019/0319790 A1* | 10/2019 | Fenner | G06F 21/57 |
| 2019/0342177 A1* | 11/2019 | Shah | H04L 41/0893 |
| 2019/0377907 A1* | 12/2019 | Fu | G06F 21/72 |
| 2019/0386974 A1* | 12/2019 | Fernando | H04W 12/084 |
| 2020/0021445 A1* | 1/2020 | Caceres | G06F 21/44 |
| 2020/0027022 A1* | 1/2020 | Jha | G06N 3/08 |
| 2020/0053065 A1* | 2/2020 | Wisniewski | H04L 63/06 |
| 2020/0084620 A1* | 3/2020 | Jana | H04L 9/0869 |
| 2020/0097661 A1* | 3/2020 | Block | H04L 9/3271 |
| 2020/0099536 A1* | 3/2020 | Block | H04L 9/3236 |
| 2020/0159966 A1* | 5/2020 | Sibert | H04L 9/3271 |
| 2020/0175179 A1* | 6/2020 | Iyer | G06F 21/602 |
| 2020/0177384 A1* | 6/2020 | Iyer | G06F 21/44 |
| 2020/0196122 A1* | 6/2020 | Junk | H04L 9/3213 |
| 2021/0044575 A1* | 2/2021 | Kong | H04L 9/3268 |
| 2021/0081545 A1* | 3/2021 | Mulligan | G06F 9/45558 |
| 2021/0105265 A1* | 4/2021 | Yang | H04W 12/047 |
| 2021/0218559 A1* | 7/2021 | Xia | H04L 9/0825 |
| 2021/0234678 A1* | 7/2021 | Armleder | H04L 9/0822 |
| 2021/0334010 A1* | 10/2021 | Charles | G06F 3/0614 |
| 2022/0004627 A1* | 1/2022 | Smith | G06F 21/572 |
| 2022/0038272 A1* | 2/2022 | Hershman | H04L 9/0866 |
| 2022/0108028 A1* | 4/2022 | Gorog | H04L 9/0827 |
| 2022/0114249 A1* | 4/2022 | Grancharov | G06F 21/53 |
| 2022/0131854 A1* | 4/2022 | Joshi | G06Q 20/40 |
| 2022/0179674 A1* | 6/2022 | Goel | G06F 9/45558 |
| 2022/0311614 A1* | 9/2022 | Stolbikov | H04L 9/0825 |
| 2022/0315240 A1* | 10/2022 | Kubisiak | H04L 9/0825 |
| 2022/0377113 A1* | 11/2022 | Hoffpauir, IV | H04L 63/0435 |
| 2022/0393868 A1* | 12/2022 | Mozano | G06F 21/6218 |
| 2023/0074708 A1* | 3/2023 | Shen | H04L 9/0894 |
| 2023/0103259 A1* | 3/2023 | Raman | H04L 9/0869 |
| | | | 380/44 |
| 2023/0179478 A1* | 6/2023 | Ishikawa | H04L 41/0816 |
| | | | 709/221 |
| 2023/0185606 A1* | 6/2023 | Menes | G06F 9/5027 |
| | | | 718/102 |
| 2023/0188341 A1* | 6/2023 | Ying | H04L 9/0891 |
| | | | 713/193 |
| 2023/0319573 A1* | 10/2023 | Li | H04W 12/041 |
| | | | 726/9 |
| 2023/0379353 A1* | 11/2023 | Fichter | H04L 63/0442 |
| 2023/0391345 A1* | 12/2023 | Sarkar | H04W 4/40 |
| 2023/0396431 A1* | 12/2023 | Liu | H04L 9/0643 |
| 2023/0421462 A1* | 12/2023 | Xie | H04L 9/0894 |
| 2024/0004681 A1* | 1/2024 | Graf | G06F 21/44 |
| 2024/0048380 A1* | 2/2024 | Berger | H04L 9/0891 |
| 2024/0080663 A1* | 3/2024 | Huang | H04W 12/0431 |
| 2024/0089239 A1* | 3/2024 | Kakaiya | H04L 9/0897 |
| 2024/0163264 A1* | 5/2024 | Kim | H04L 63/0428 |
| 2024/0235852 A1* | 7/2024 | Cate | H04L 9/3268 |
| 2024/0248994 A1* | 7/2024 | Singh | H04L 63/0823 |
| 2024/0257097 A1* | 8/2024 | Arora | G07F 7/122 |
| 2025/0103737 A1* | 3/2025 | Shea | G06F 16/2379 |

* cited by examiner

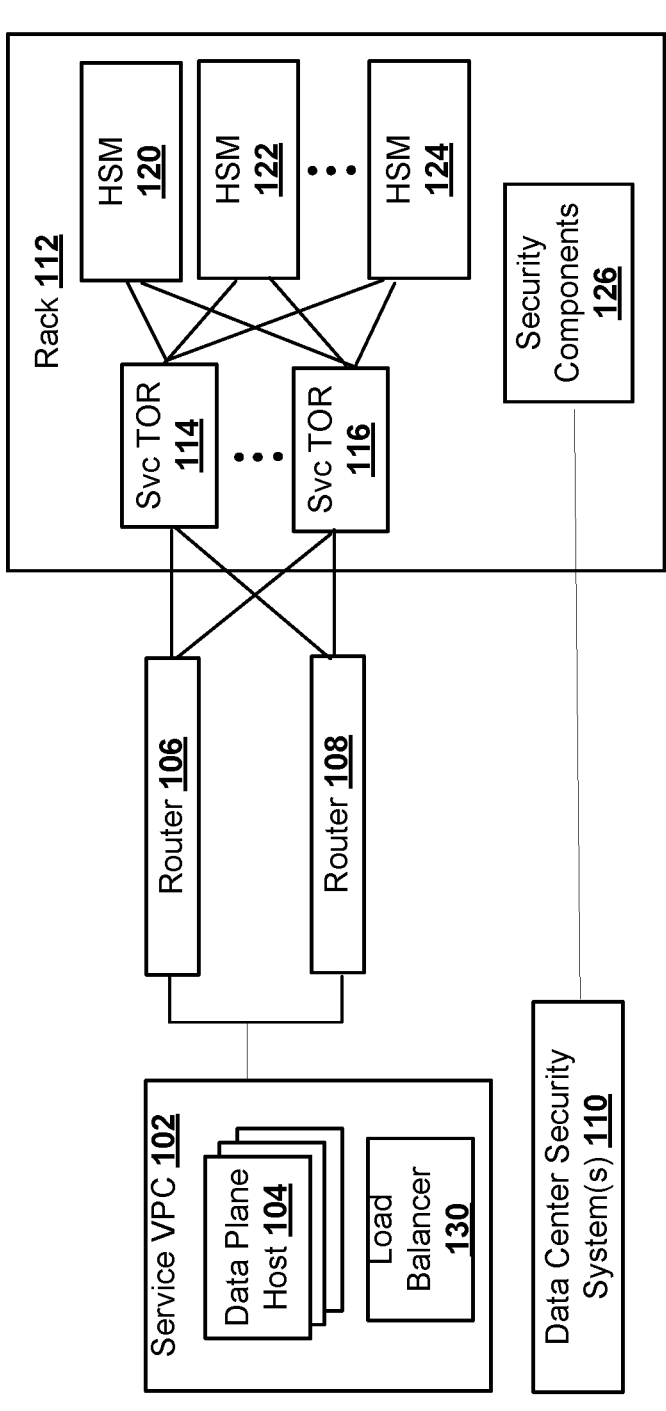
FIG. 1

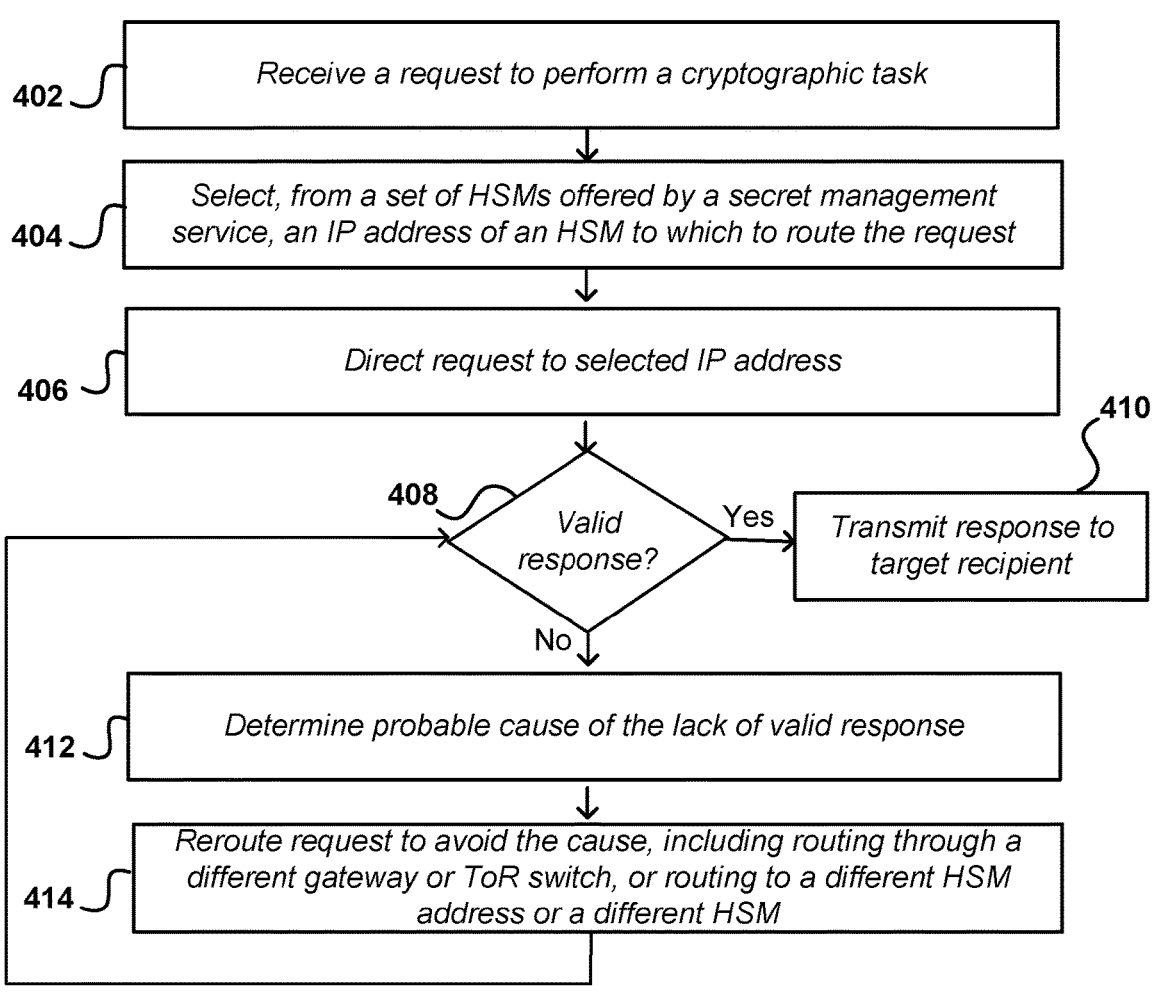

400

402  Receive a request to perform a cryptographic task

404  Select, from a set of HSMs offered by a secret management service, an IP address of an HSM to which to route the request 406  Direct request to selected IP address

410

408  Valid response?

Yes  Transmit response to target recipient

No

412  Determine probable cause of the lack of valid response

414  Reroute request to avoid the cause, including routing through a different gateway or ToR switch, or routing to a different HSM address or a different HSM

FIG. 4

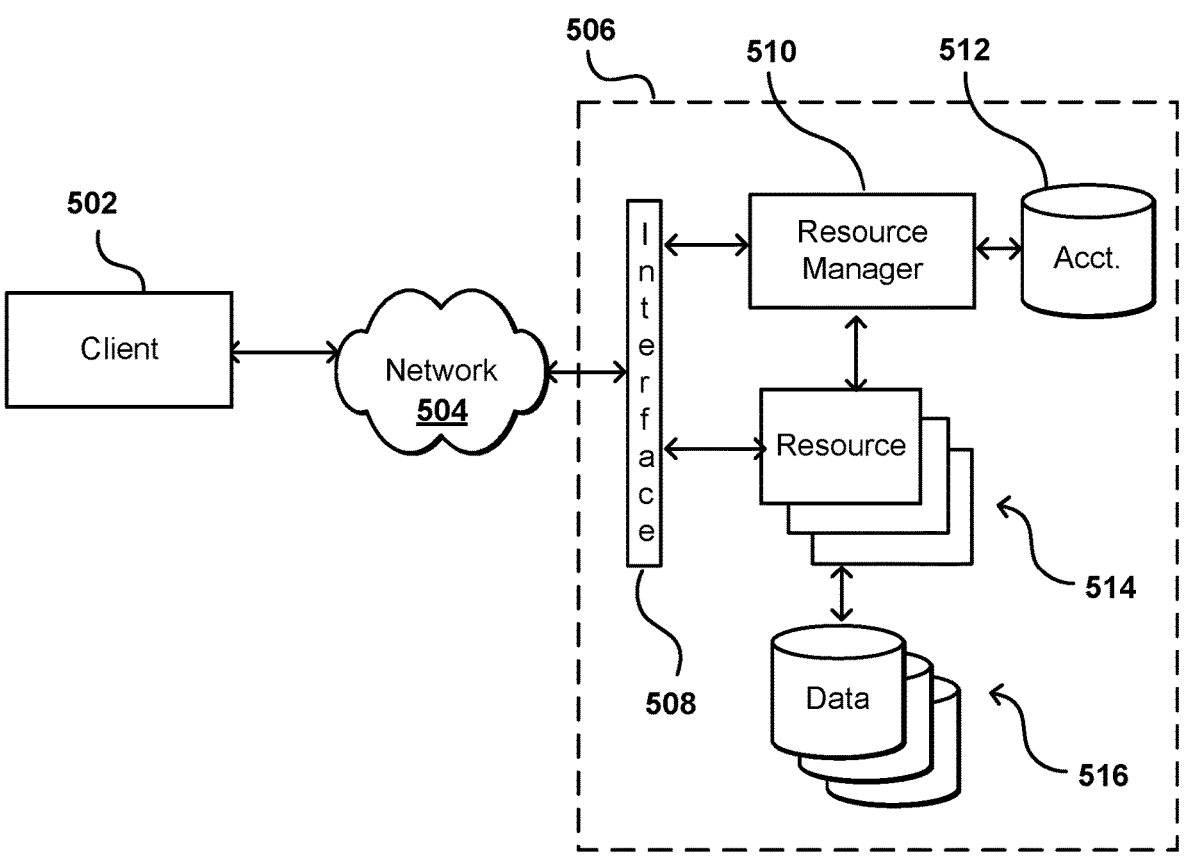
FIG. 5

DISCOVERY AND ATTESTATION OF HARDWARE SECURITY MODULES

BACKGROUND

As an ever-increasing amount of sensitive data is being stored and processed in networked computer environments, and the ability of entities to obtain unauthorized access to data becomes more advanced, there is a corresponding need to improve or increase the security mechanisms used to protect that data. Protection can be particularly important for certain types of operations, such as those that relate to monetary transactions performed electronically using computing resources provided across a network that is accessible to multiple entities. Various existing approaches use shared secrets, such as cryptographic keys, to securely store and transmit data. These secrets can be stored using mechanisms such as hardware security modules (HSMs) where a secure processor can use these secrets to perform tasks such as encryption, decryption, and authentication. Existing approaches to providing such HSMs have proven to be insufficient in various situations. For example, operations such as payments may require very specific types of operations or levels of compliance be provided or supported by an HSM, such that a single HSM may not be sufficient for all types of operations to be performed in a networked environment. Further, the workload may fluctuate over time, and there may not be sufficient HSM resources of a given type at the appropriate times to support higher workloads, which can result in increased latency of processing or even dropped transactions in some instances.

BRIEF DESCRIPTION OF THE DRAWINGS

Various embodiments in accordance with the present disclosure will be described with reference to the drawings, in which:

FIG. 1 illustrates an example system providing cryptography capabilities as a service that can be used in accordance with various embodiments.

FIG. 4 illustrates an example process for rerouting requests that can be performed in accordance with various embodiments.

FIG. 5 illustrates an example network-inclusive computing environment in which aspects of various embodiments can be implemented.

DETAILED DESCRIPTION

Figure 2:
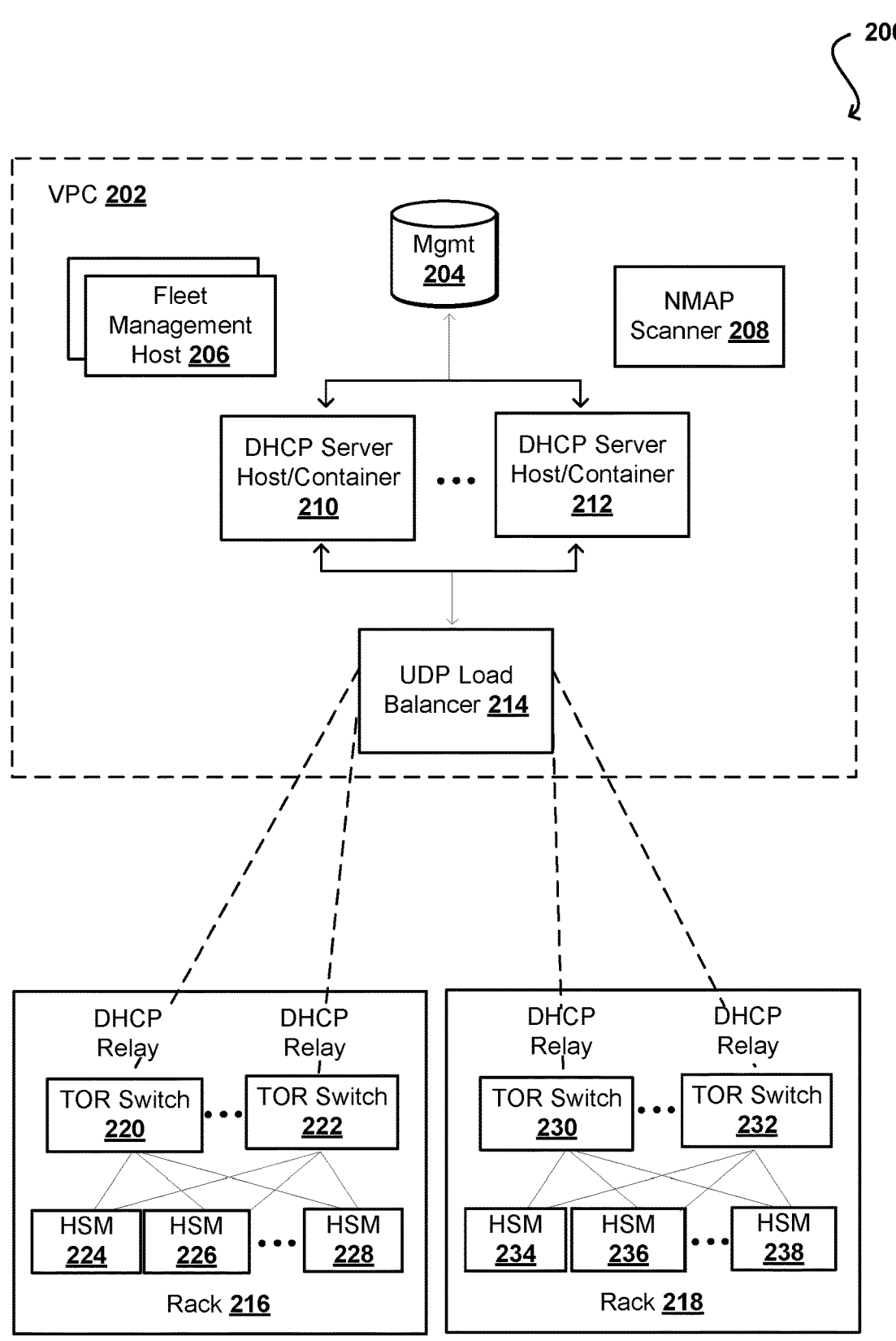
FIG. 2 illustrates an example HSM fleet to which requests can be routed in accordance with various embodiments.

Approaches described and suggested herein relate to the management of resources used to perform tasks, such as cryptography-related tasks, in a networked computer environment. In particular, various embodiments can provide cryptographic functionality as a service using a fleet of hardware security module (HSM) devices, or other such trusted hardware, where the number of devices in the fleet can be adjusted over time in a highly available manner, and newly-connected devices can be automatically discovered and attestation performed.

In at least one embodiment, cryptographic functionality can be provided as a service using a set of shared computing resources. This can include, for example, a set of HSM devices connected by a set of switches and direct communication channels to one or more servers that can receive and route requests to perform cryptographic tasks. The servers may be any appropriate servers, such as dynamic host configuration protocol (DHCP)-compliant servers that can automatically assign addresses, such as Internet protocol (IP) addresses, to HSM devices that are added to the set or fleet. When a new HSM device is connected to the network, to be added to the fleet, a discover request or packet can be received to one of the servers to obtain an IP address for the HSM device. The server can send an attestation request to the HSM, which can include a challenge question or other such authentication mechanism. In response, the HSM can send a response to the challenge question, as well as information such as the serial number of the HSM and a time stamp at which the response was generated. The server receiving the response can validate the challenge response, and can verify that the serial number of the device is on a list of expected serial numbers received from a manufacturer or supplier of the HSM, and that the serial number was not previously reported by another HSM. The timestamp can also be analyzed to ensure that the response was generated in a valid time window, such as a window of time shortly after the request was sent but before the response was received. If the information is all valid or expected, then a provisioning workflow can be initiated for the authenticated HSM. As part of the provisioning workflow, the new HSM can be configured similarly to other HSMs in the fleet, and can be provided with a copy of all necessary master keys or other such shared secrets. The HSM can also have a pair of interfaces associated with separate network interface cards (NICs), for example, and each of these interfaces can be dynamically assigned a static IP address to use for communication. Once the HSM is fully configured and communication is allowed using the assigned IP addresses, the newly-added HSM can be considered part of the fleet and can be routed any relevant requests to perform one or more cryptographic (or other) operations using one or more of the stored master keys. In the event that a response is not timely received for a request, the request can be re-routed to a different IP address or HSM, or can be routed through a different switch or channel, as needed, to attempt to avoid any availability issues that might result from the unavailability of a given device or resource. In addition to providing high availability, such an approach also allows the fleet of HSMs to be scalable, as the number of HSMs can be increased or decreased as needed, and newly added or connected HSMs can be automatically discovered, authenticated, and configured for use as part of a security-related service offering.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example configuration 100 of components of a system (or service) that utilizes shared secrets for security purposes, in accordance various embodiments presented herein. In this example, a set of shared computing resources can be allocated to perform various operations, where at least some of those operations involve shared secrets (e.g., cryptographic keys) that are stored in one or more secure hardware devices, such as one or more hardware security modules (HSMs) 120, 122, 124 (up to a number that may be inserted into a given rack in at least one embodiment). Such a configuration 100 can be used to provide users (e.g., customers of a provider of the service or resources used to provide the service) with secure operations through one or more interfaces, such as application programming interfaces (APIs). These operations may include, for example, key management and stateless payments, among other such options. The example configuration 100 includes a number of HSMs 120, 122, 124 in a server rack 112, where the HSMs can be similarly or alternatively configured, as may be required for different types of tasks. In at least some embodiments, additional HSMs can be added and automatically detected by the system, and various HSMs can be removed or taken offline, which can also be detected and accounted for automatically by the system using approaches such as those presented herein.

In at least one embodiment, a fleet of hardware security modules (HSMs) 120, 122, 124 can be implemented and used for a variety of operations. An HSM can take the form of secure computing hardware (e.g., a crypto processor, or a device including one or more such processors) that can perform tasks relating the management of secrets (such as encryption keys), as well as tasks that use those secrets such as encryption, authentication, or generation of digital signatures, among other such tasks. HSMs can be used with physical or virtual compute resources, such as may be part of a virtual private cloud (VPC) offering 102. A VPC can be provided through a service offered by a service provider, for example, where the VPC can be used to launch virtual compute resources in a logically isolated virtual network. The VPC may include a number of data plane hosts 104 that can be connected to the HSMs using network components such as one or more routers 106, 108 and one or more service top of rack (TOR) switches 114, 116 of a physical rack 112 in which at least some of the HSMs are located. The rack 112 may include additional components as well, such as one or more other TOR switches, such as may connect one or more security components 126 of the rack 112 with one or more data center security systems 110. In at least one embodiment, where the data plane hosts 104 are provided using resources (e.g., EC2 instances of Amazon Web Services, Inc.), the service VPC 102 can be connected to the various HSMs using a direct channel connection through at least one transit gateway. The data plane hosts 104 may take the form of a group of dynamic host configuration protocol (DHCP) servers in the service VPC 102. The DHCP servers in this example can be tasked with vending addresses (e.g., Internet protocol (IP) addresses) to the HSMs 120, 122, 124 of the fleet through the use of one or more DHCP relays, as may be specified in one or more routers for various data center racks.

In at least one embodiment, as illustrated in the example system 200 of FIG. 2, a load balancer 214 (such as one compliant with the user datagram protocol (UDP)) in the VPC 202 can be used to transparently load balance a number of different DHCP servers, hosts, or containers 210, 212. This can include scaling up or scaling down the number of DHCP servers 210, 212 needed to handle DHCP requests in the network. One or more fleet management hosts 206 or servers can perform tasks such as to vend network addresses, such as IP addresses, as well as to perform DHCP lease accounting and other such tasks. The fleet management host(s) can store information for these tasks to a fleet management repository 204 or other such datastore that is available within the given VPC 202.

In at least one embodiment, such a system 200 can be used to perform provisioning tasks for various devices. This can include, for example, hooking into various DHCP requests and using discovered packets as triggers for device discovery. Detection of these triggers can cause one or more device provisioning workflows to be initiated, after any initial tasks such as assignment of the IP addresses to the HSMs have been performed. The fleet management host(s) 206 can also check to determine whether the MAC address given to use in the DHCP Discover and Request packets match what is expected in the fleet management repository 204. In one embodiment, DHCP option 61 can be populated with a base64 encoded x509 Certificate, with the Subject Common Name being the logical serial number of the HSM. A vendor of the HSM can share with their Certificate Authority that was used to issue the HSM certificate such that a fleet management host 206 (or other responsible component in or associated with the VPC) can validate that the serial number for the HSM is expected, and that it has been signed by a valid certificate. Such an attestation process can be used to ensure the HSM device is not a malicious actor, or otherwise poses a potential security risk.

In the example configuration of FIG. 2, the load balancer 214 is shown to be able to balance across HSMs in one or more server racks 216, 218 (or other such resource groupings). The load balancer can communicate through one or more top of rack (TOR) switches 220, 222, 230, 232 in each rack 216, 218 to reach the respective HSMs 224, 226, 228, 234, 236, 238. In this example, each HSM device has two ports (e.g., Ethernet ports) that can each be attached to a different network interface card (NIC). Each NIC can have its own MAC address and be vended its own IP address, enabling individual HSMs to be contactable over either IP address for increased availability. In a TOR-down scenario as illustrated, a fleet management host 206, load balancer 214, or other such component can passively detect which TOR when down by inferences. For example, if all HSM IP addresses assigned to Ethernet port 1 are unreachable in a given rack then it is a safe assumption that the respective TOR is down or otherwise unavailable.

An example DHCP server 210 can be customized or configured specifically to perform various tasks. For example, a given server can hook onto the DHCP Discover, Request, Release, an Inform packets from a client and use those packets to kick off provisioning workflows, telemetry, attestation, and/or other such operations with a given system. For example, if a DHCP discover packet is received with an invalid MAC address that is not expected, one or more alarms can be triggered in response. The information in the packet can also be used to pinpoint the rack and/or TOR switch to which the unexpected device is connected, such as by analyzing the gateway address (e.g., GIADDR) field in the DHCP packet, which will be the address conferred to the TOR switch. Such an approach can also help to detect misconfiguration or incorrect cabling of one or more HSMs in a rack or other such location.

Systems such as those illustrated in FIGS. 1 and 2 can provide for the secure storage and management of shared secrets on behalf of multiple separate users or entities. Such systems can also perform various types of cryptographic processing or other security-related operations, such as may be specific to tasks such as electronic payments. This might include, for example, payment operations such as decrypting and encrypting a pin number, or validating a card verification value (CVV) on a credit card, among other such options. To perform such operations, at least some of the HSMs provided by such a system or service have to support these specific cryptographic operations, and need to do so in a way that complies with any applicable rules or regulations (e.g., offering Payment Card Industry Data Security Standard (PCI DSS) compliance).

In at least one embodiment, HSMs and related functionality can be provided as a type of service to which other services can connect. The direct connection can be provided by interconnect in a latency-sensitive manner, so that any applications or functions executing in a given service VPC can quickly obtain the results or data needed from the managed HSM(s). As described, the HSMs can present themselves on the network using one or two IP addresses to which requests can be routed. In at least some embodiments, HSMs may be located in different geographic locations to which requests can be routed based on latency, availability, or other such concerns. In some embodiments the addresses and related information that is static for respective HSMs and may be provided as received from the manufacturer or supplier. In order to provide at least some flexibility, a system or service as provided herein can dynamically assign statically-mapped IP addresses (or other appropriate network addresses) to at least some of the HSMs. The IP addresses can be statically mapped in the system, whereby an HSM with a specific serial number can be statically provisioned to always have a given IP address, but the way in which the provisioning and IP address assignment is performed can be dynamic, such as may be accomplished through the DHCP. In at least one embodiments, IP addresses can also be transferred or re-used, such as where one HSM is removed and another HSM (or other physical device) provisioned, and one or more of the IP addresses from the removed HSM can be reassigned to the newly-provisioned HSM. Such an implementation can be used with software-defined networking, enabling HSM functionality to be provided as a service to applications running on hosts in a VPC or other such environment. As illustrated in FIG. 2, a DHCP server 210 can run in the VPC environment 202 and can be connected to a number of HSMs through a network mesh including a number of TOR switches 220, 222, 230, 232. Such an approach can provide for high availability, as any node in the mesh going down (including a TOR switch in a rack) will not prevent the relevant HSMs (or other parts of the service) from being accessible. As another example, a failure of a given router will not impact availability as the traffic can be re-routed through the other router of the relevant network fabric.

In an example DHCP-based implementation, an HSM can be provided with the IP address that the HSM is to use for a specific port or connection. The HSM can also be provided with identification of a gateway the HSM should use or go through for that connection. And each HSM can have two Ethernet interfaces on the physical box, each with its own IP address and relative routing information, such as where each unique IP address points to a different switch. Based on that, the HSMs can present themselves at different mapped addresses, and the system can maintain routing information for the different interfaces, such as to indicate that a mapped address corresponds to a specific interface of an HSM that could be communicated with through a specific gateway, etc.

In at least one embodiment, HSMs can be treated as interchangeable resources from among a pool of resources. The HSMs can have master keys stored on them and can be stateless, such that any incoming transaction received over an API or other such interface can be routed to any of the HSMs, at least those HSMs that have the appropriate main or master keys loaded onto them. The actual key store may be maintained outside of any of the individual HSMs, but those keys are not in plaintext but instead will typically be wrapped with the HSM master key. This HSM master key can be used to wrap various keys stored in a database outside the HSM. Such an approach can be considered to be stateless in that a query can be sent to any of a set of HSMs, and the receiving HSM can use the relevant HSM master key to unwrap the wrapped key received with the query and preform the relevant operations. The HSM can then perform the operation using the unwrapped key and return a result of the operation, which may be at least partially wrapped as well in at least some embodiments. The stateless HSMs may thus not store any relevant data for the operations.

Such a system can also provide for discovery of new, modified, or removed resources in at least one embodiment. As mentioned, servers such as DHCP servers 210, 212 in a VPC environment 202 can provide or support various triggers for initiating provisioning workflows. An example provisioning workflow can authenticate the HSMs, apply relevant configuration and install one or more specified certificates on the authenticated HSMs, among other such operations. In at least one embodiment, an HSM can be authenticated by verifying that information for the HSM matches expected information, indicating that the HSMs are as expected and sent from the manufacturer, and were not intercepted and modified in transit. Such authentication can also help to ensure that an HSM device added to the network is not a rogue device that should not receive secure or sensitive information (or even be allowed to communicate on the network for at least some types of devices).

In one example, the physical connection of one or more network wires to an HSM device (or the detection of such a physical connection) can act as a trigger to kick off an authentication workflow. In some embodiments, an HSM device being physically connected to a network will send out a discover packet (or other such message or request. The receipt of such a packet by a DHCP server, for example, can cause the DHCP server to initiate an authentication process or workflow. This can include, for example, obtaining information from the newly-connected HSM and verifying that information against information that was received from the manufacturer or supplier beforehand. As an example, a manufacturer might send a file indicating the serial numbers of a number of HSMs that are being shipped to a service provider or data center. When an HSM is connected to the network, the DHCP server can obtain the serial number from the newly connected HSM and ensure that this serial number matches one of the expected serial numbers in the file, and also is not a duplicate serial number with respect to any other HSM on the network. Other information about the HSM may be checked as well to help ensure that the HSM was not modified during transit, etc. Once the HSM is authenticated, a provisioning workflow can be initiated or kicked off with respect to that HSM.

Using a discover packet as a trigger can have limitations, however, as that can assume that a hardware device that is newly connected to a network will request an address (IP or otherwise) to use for communication. A device might instead send and use a static IP address to communicate over the network, assuming the device knows the IP address of the relevant network gateway or other such information. Many DHCP servers will allow such a device to communicate on the network. Even if a device is detected using such an approach, the device can potentially replay an intercepted discover packet that could cause the device to be trusted. Thus, at least some systems can utilize additional access controls as well, such as port access controls. An network mapper (NMAP) scanner 208 is illustrated in the VPC 202 in FIG. 2 that can perform tasks such as ping sweeps or port scans of an entire site or range of HSM addresses to attempt to locate any new, modified, or unexpected devices. A device might be able to hide from an NMAP scanner 208 by not responding to these pings or sweep messages, for example, so other mechanisms such as 802.1x may be used that may be more reliable in detecting rogue devices on a network.

In the example illustrated in FIG. 2, a UDP network load balancer 214 can be configured to present itself as a virtual IP address in the network. In this example, the load balancer 214 resides within the VPC 202. The UDP load balancer can rewrite the source and destination IP addresses of a packet, which allows for load balancing to be performed. In this example, the DHCP servers sit behind the virtual IP address. For example, a DHCP target can be behind the UDP Network Load Balancer 214 on Port 67, as well as the specific virtual IP address, and the TOR switches can be targeted at that IP address so that they relay the DHCP discover packets that are broadcasted on the broadcast domain from the HSMs to the switches. The DHCP servers can also be scaled as needed to handle additional or fewer requests over time. In at least one embodiment, a lease renewal mechanism such as a periodic heartbeat can be used to that the continued connection and availability of the various HSMs. In some embodiments, each HSM could be periodically configured to send a heartbeat packet and/or license renewal, and then the number of DHCP servers can be scaled based in part upon the number of such packets or renewals received. In at least one embodiment, the relevant lease information can be stored to the management repository 204. Such an approach can help to ensure at least a minimum level of availability, as the DHCP servers can dynamically assign IP addresses and gateway pairs through the different ethernet ports on the HSMs, where those ports connect to the same network fabric.

In FIG. 2, an HSM 224 can talk to a DHCP server 210, such as to send a discover packet to the DHCP to initiate a handshake or communication agreement between the HSM and the DHCP server. In at least one embodiment, the DHCP server 210 might send a random or semi-random challenge question in the DHCP response for the HSM. The manufacturer of the HSM may have agreed to certain information ahead of time that can be used to answer the challenge question. In one example, the HSM might return a response that is a concatenation of the serial number of the HSM, the answer to the challenge question, and a time stamp. Upon receiving the response, the DHCP server can verify that the HSM is an expected HSM by comparing the indicated serial number to the list of expected serial numbers, verifying the correctness of the challenge response, and verifying that the time stamp indicates a time shortly after the initial challenge request was transmitted to the HSM. The response may also be encrypted with the appropriate key or have the appropriate signature attached. In other embodiments, the challenge may be instead to encrypt the concatenated serial number and time stamp with a specific master key that was preloaded onto the HSM, among other such options. Once the HSM is validated using this information, at least one IP address can be assigned to the HSM.

It might be the case, however, that an authentication process fails, such as where the serial number reported does not match an expected serial number, or where the HSM is unable to properly response to the challenge. In such an instance, the system can avoid assigning an IP address if a static address has not been used, or can attempt to block any communication with the static IP address if present. The system can also trigger one or more alarms to cause human security personnel to investigate the issue, and the HSM can be disconnected or isolated from the network where customer data might be present. If the HSM has not yet been added to the pool of available HSM resources, then it can be ensured that such addition does not occur so that the HSM does not receive live requests. In some embodiments, a setting on firewall might be set to block any communication from an IP address associated with the rogue HSM, among other such options.

In at least one embodiment, the HSMs added to a pool may be limited to use in a specific region. Limiting keys to a specific region can help to ensure compliance with any data export or privacy regulations, among other such constraints. In this way, all HSMS in a given region (at least that are used for one or more similar operations) can have the same set of keys duplicated and stored therein, but HSMs in another region may have a completely different set of keys that are relevant for that region, even if the HSMs for both regions can serve requests for a common user or entity. Keeping keys in specific regions can also help with latency, among other such factors, as the requests do not have to travel as far as might otherwise be required.

Such a system or service can be used to provide security-related functionality for many different applications or uses. For example, the fleet of HSMs can be used to perform cryptographic tasks for use in an electronic payment system, as may relate to verification of credit or account information. In some embodiments, a fleet of HSMs used for such tasks may be separate from a fleet used for other tasks, as there may be specific rules, regulations, or criteria applicable for payment-related information. HSMs can be used to perform cryptographic tasks for any appropriate use, however, such as where encryption, decryption, or authentication related tasks are to be performed using shared secrets that are to be securely stored to control access, such as where master keys are not to be shared outside the HSMs.

Figure 3:
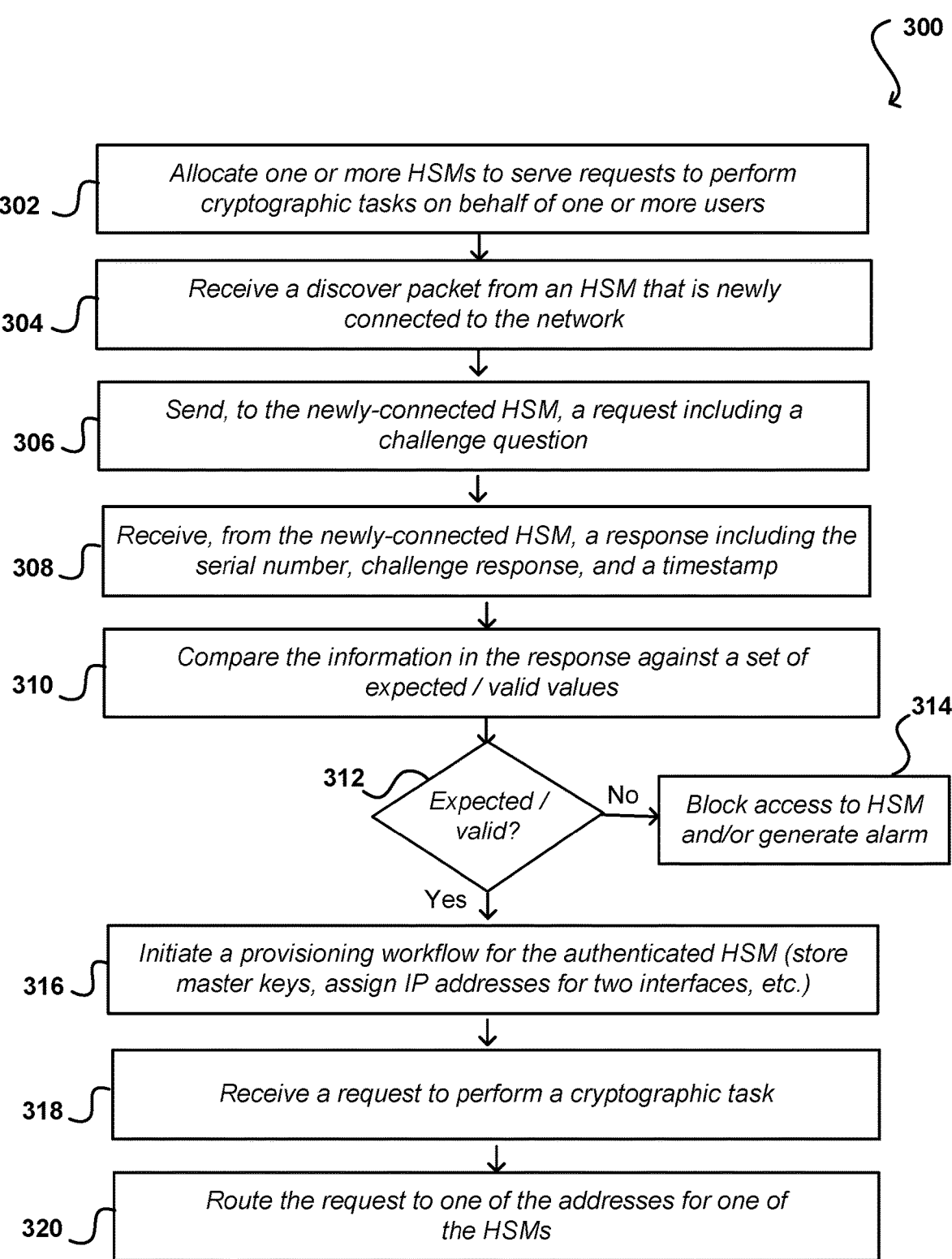
FIG. 3 illustrates an example process for discovering and attesting to a newly-connected HSM that can be performed in accordance with various embodiments.

FIG. 3 illustrates an example process 300 for discovering and attesting for security hardware that can be performed in accordance with at least one embodiment. It should be understood that for this and other processes discussed herein that there may be additional, fewer, or alternative steps performed in similar or alternative orders, or at least partially in parallel, within the scope of the various embodiments unless otherwise specifically stated. Further, although this example is discussed with respect to hardware security modules, it should be understood that such processes can be performed for other types of secure or trusted hardware as well within the scope of various embodiments. In this example, one or more hardware security modules (HSMs) are allocated 302 to serve requests to perform cryptographic tasks on behalf of one or more users. In at least one embodiment, this can include a fleet of HSMs with similar configuration and capabilities that store the same master keys (or at least some of the same cryptographic keys or shared secrets) such that a request to perform a cryptographic task can be routed to any of the HSMs of the fleet. In some embodiments, there may be multiple fleets of HSMs, where each fleet may be configured or store different keys to perform different types of tasks, as may have different requirements, etc. Each HSM may be configured with two IP addresses corresponding to different network interface cards, providing for higher availability and increased routing options. The allocation may be performed by one or more servers, such as DHCP compliant servers as discussed elsewhere herein, as may be hosted in a VPC or other such environment or location. The DHCP servers can connect with the fleet of HSMs using at least two direct connections or communication channels in at least some embodiments.

In this example, a new HSM device can be added to the network, and upon connection can send a discover packet to obtain an IP address. In other examples, the new or additional HSM may have a static IP address and may not send a discover packet, where discovery and attestation can be performed using an alternative approach as discussed elsewhere herein. A discover packet can be received 304 from the HSM that is newly connected to the network (corresponding to the fleet), and in response a request can be sent 306 to this newly-connected HSM including a challenge question, such as may be randomly selected from a set of agreed upon challenge questions or types of questions. The request can be sent from one of the DHCP servers or another such source, such as an attestation device in communication with the DHCP servers in the relevant VPC. If a valid response is not received then the HSM will not be added to the fleet, and an alarm might be raised or other action taken. In this example, a response is received 308 form the newly-connected HSM that includes the serial number of the HSM, a response to the challenge question, and a timestamp, although other or additional information may be included in other examples or embodiments. The information in the response can be compared 310 against a set of expected or valid response values. This might include, for example, a list of expected serial numbers provided by a manufacturer or supplier of the HSM device, and an expected challenge response corresponding to the selected challenge question, where the supplier or manufacturer also agreed before shipment to the challenge questions and responses to be built into the HSM device. The timestamp should also correspond to a time that is within a reasonable window of time after the request was sent, but before the response was received from the HSM. A determination can be made 312 as to whether the received values correspond to expected or valid values, given the attestation request that was sent. If not, then access to the HSM can be blocked, so that the newly-connected HSM does not have access to user data in the network, and/or an alarm can be generated to indicate that the HSM may be corrupt or a rogue device that should be removed from the network or otherwise processed or handled.

If, however, it is determined that the values in the response are all expected or valid values given the attestation request that was sent, then a provisioning workflow can be initiated 316 or kicked off for the authenticated HSM, the identity and trust of which the DHCP server is willing to attest. The provisioning workflow can include operations such as to cause the appropriate master keys or other shared secrets to be stored to the HSM, and to ensure that any configuration or capabilities are set so that the HSM is appropriate for any intended usage and satisfies any related requirements. The workflow can also dynamically assign two static IP addresses to the HSM, one for each interface or NIC of the device. Different embodiments might assign additional or fewer IP (or other addresses) to each HSM. In this example, a request is subsequently received 318 to perform a cryptographic task, such as to encrypt or decrypt a piece of data or authenticate a signature, among other such options. The request can be routed to a selected IP address of a selected HSM of the fleet, which may correspond to the newly-added HSM or one of the other HSMs, which provide common capabilities and can each perform the cryptographic task.

One benefit to using multiple addresses, switches, connections, and other such components for a security-related service is that such a deployment can provide for higher availability that for other types of deployments. An example for ensuring such availability is given by the process 400 illustrated in FIG. 4. In this example process, a request is received 402 to perform a cryptographic task, as may correspond to a request received to a DHCP server in a VPC to perform a cryptographic task on behalf of a user or other authorized entity. An IP (or other) address can be selected 404, such as by a DHCP server, for an HSM of a set or fleet of HSMs to which to route the request. As mentioned, the fleet may be offered as part of a service and may include a number of similarly configured HSMs that are able to perform similar cryptographic (or other) tasks, where the number of HSMs in the fleet can be scaled up or down as appropriate, based on various factors or determinations. The request can then be directed 406 or routed to the selected IP address. A determination can be made 408 as to whether a valid response is received from the target HSM in response to the request. In this context, "valid" refers to a properly formed response received in response to the request, and does not necessarily refer to the validity or correctness of any actual response values contained therein. If a valid response is received, then the response can be transmitted 410 to the target recipient, which may be the source of the initial request or a specified recipient. In some embodiments, additional processing or analysis of the request may be performed before transmitting the response. If a valid (or invalid) response is not received within an expected or threshold amount of time from the routing of the request, a probable cause of the lack of response can be determined 412. This may include, for example, determining whether a valid response was only not received from this HSM, determining whether responses were not received from a subset of HSMs connected to a specific switch or receiving communications through a specific connection or channel, etc. Once the probable cause is determined, the request can be rerouted 414 to attempt to avoid the probable cause, such as to reroute through a different channel or switch, to send to a different IP address for the same HSM, or to send to a different HSM of the fleet, among other such options. In some embodiments, rerouting may be performed in a specified order where a cause cannot be determined or where such determination functionality may not be available, such as to first route to a different address of the same HSM, then a different HSM connected to the same switch, then a different HSM connected to a different switch under the same channel, etc. Such an approach can then be used to determine the likely cause of the response failure through the rerouting of the request. Once a valid response is returned, an action can be taken based on the responses that were not received that are indicative of the cause.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. For example, the provider environment 506 can be a cloud environment that can be used to provide cloud-based resource capability for users, as may be used to perform various cryptographic tasks such as data encryption, decryption, or authentication. At least some physical or virtual resources 514 may be provided through a virtual private cloud, and cryptographic functionality may be provided through a set of resources 514 offered as a service, where any of various resources may be used to perform one or more tasks for a request. Resources 514 of a provider environment 506 may host network management service functionality, among other such operations.

In this example a user is able to utilize a client device 502 to submit requests across at least one network 504 to a multi-tenant resource provider environment 506. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
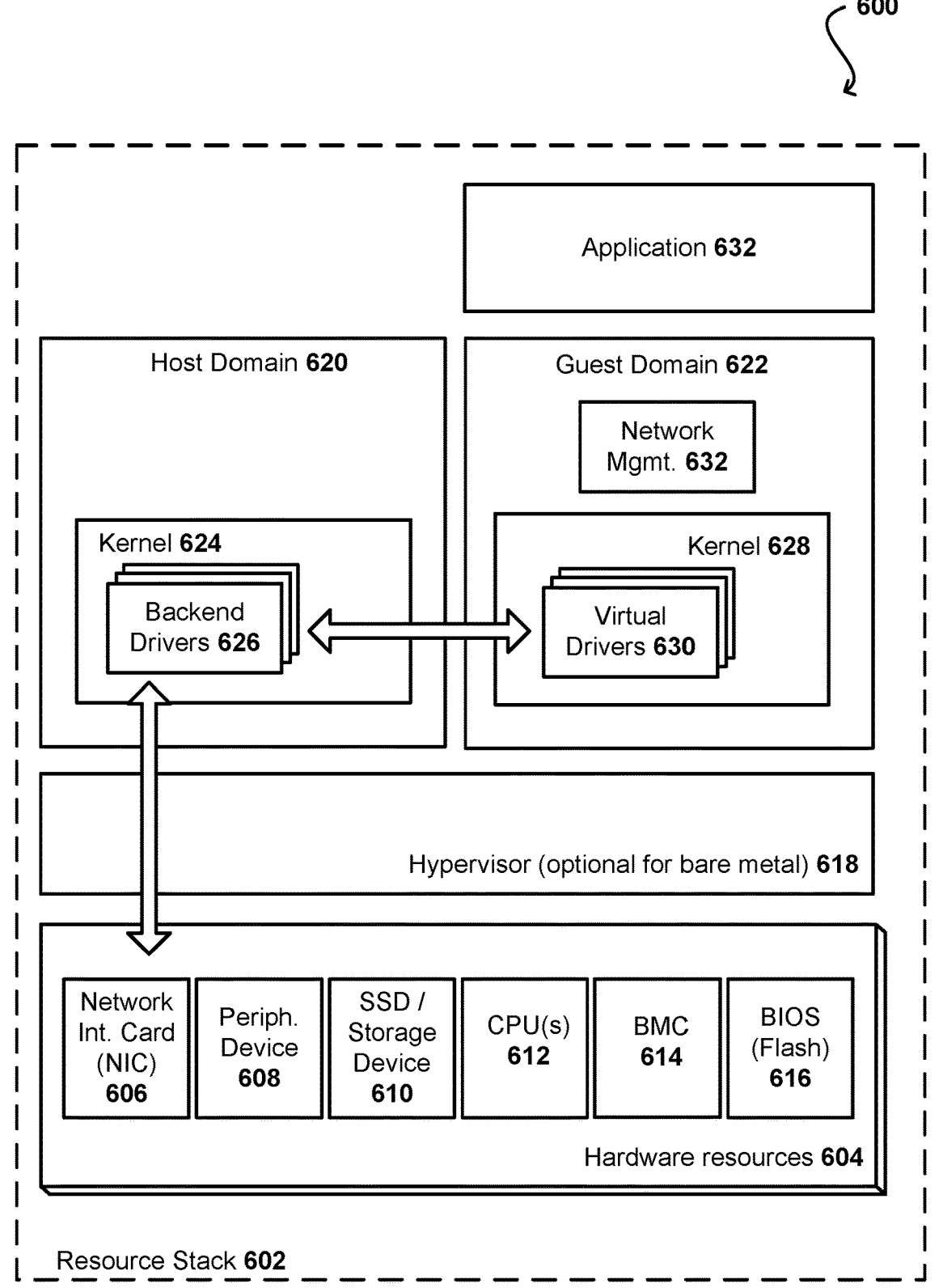
FIG. 6 illustrates example components of a server that can be utilized to perform at least a portion of a discovery and attestation process, in accordance with various embodiments.

FIG. 6 illustrates an example resource stack 602 of a physical resource 600 that can be utilized in accordance with various embodiments, such as may be provided as part of a provider environment such as that illustrated in FIG. 5. When performing tasks, such as cryptographic tasks to be performed for an application 632, for example, such resources can include components such as CPUs 612 for executing code to perform these tasks, NICs 606 for communicating network traffic, and memory for storing instructions and networking data. In some embodiments, an entire machine may be allocated for these tasks, or only a portion of the machine, such as to allocate a portion of the resources as a virtual machine in a guest domain 622 that can perform at least some of these tasks.

Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I$^2$C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
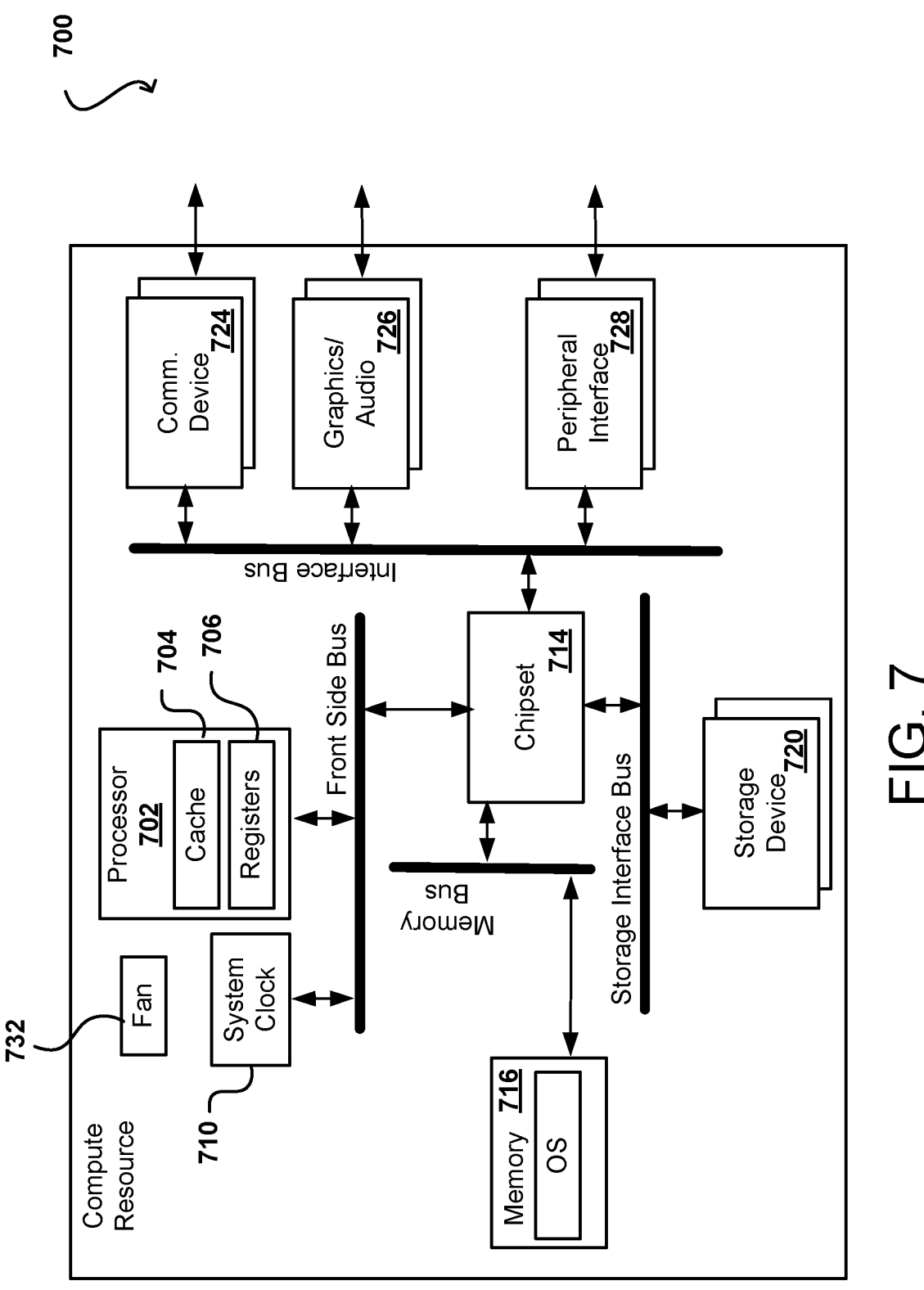
FIG. 7 illustrates example components of a computing device that can be used to implement discovery, attestation, and/or cryptographic functionality aspects of various embodiments.

Computing resources, such as servers, smartphones, or personal computers, will generally include at least a set of standard components configured for general purpose operation, although various proprietary components and configurations can be used as well within the scope of the various embodiments. As mentioned, this may include client devices for transmitting and receiving network communications, or servers for performing tasks such as network analysis and rerouting, among other such options. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC)

may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected.

Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   providing a plurality of hardware security modules to perform a set of cryptographic tasks as part of a secure data processing service, the secure data processing service provided using a network of computing resources;
   receiving a discover packet from an additional hardware security module connected to the network of computing resources;
   transmitting, in response to receiving the discover packet, a request to the additional hardware security module for attestation information;
   receiving, in response to the request and from the additional hardware security module, the attestation information, the attestation information including at least a predetermined identifier and a challenge question response;
   determining that the attestation information includes expected values for the predetermined identifier and the challenge question response;
   initiating a provisioning workflow for the secure data processing service, the provisioning workflow including configuring the additional hardware security module to satisfy one or more requirements for the set of cryptographic tasks and providing one or more master keys to the additional hardware security module;
   assigning a communication address to each of a pair of communication ports of the additional hardware security module; and
   providing additional hardware security module as available to perform the set of cryptography tasks using the one or more master keys as part of the secure data processing service, wherein a subsequent request to perform one of the cryptographic tasks is allowed to be routed to either communication address of the additional hardware security module or another hardware security module of the plurality of hardware security modules.

2. The computer-implemented method of claim 1, wherein the set of cryptographic tasks relate to electronic payments, and wherein the one or more requirements for the set of cryptographic tasks correspond to requirements for performing tasks relating to the electronic payments.

3. The computer-implemented method of claim 1, wherein the attestation information further includes a timestamp, and wherein determining that the attestation information includes expected values includes determining that the timestamp is in a time window between when the request for the attestation information was sent and a time when the response with the attestation information was received.

4. The computer-implemented method of claim 1, wherein the communication addresses are Internet protocol (IP) addresses assigned by a dynamic host configuration protocol (DHCP) server of the secure data processing service.

5. The computer-implemented method of claim 4, wherein the pair of communication ports are connected to the DHCP server using at least two switches and at least two communication channels, and wherein the DHCP server is allowed to re-route the subsequent request using any of the pair of communication ports, the at least two switches, and the at least two communication channels.

6. A computer-implemented method, comprising:
   receiving a discover packet from secure hardware device connected to a set of hardware resources;
   transmitting, in response to receiving the discover packet, a request to the secure hardware device for attestation information;
   receiving, in response to the request and from the secure hardware device, the attestation information, including at least a predetermined identifier of the secure hardware device and a challenge question response generated by the secure hardware device in response to the request;

determining that the attestation information includes one or more expected attestation values corresponding to the predetermined identifier and the challenge question response;

assigning at least one communication address to the secure hardware device; and provisioning the secure hardware device to receive, using the at least one communication address, requests to perform cryptography-related tasks as part of the set of hardware resources.

7. The computer-implemented method of claim 6, further comprising:

initiating, in response to determining that the attestation information includes one or more expected attestation values, a provisioning workflow for the secure hardware device, the provisioning workflow including configuring the secure hardware device to satisfy one or more requirements for the cryptography-related tasks and providing one or more master keys to the secure hardware device.

8. The computer-implemented method of claim 7, wherein the cryptography-related tasks including at least encrypting, decrypting, or authenticating data using one or more of the master keys scored to the secure hardware device.

9. The computer-implemented method of claim 6, wherein the secure hardware device is a hardware security module (HSM).

10. The computer-implemented method of claim 9, further comprising:

adding the HSM to an existing fleet of HSMs, wherein requests to perform the cryptography-related tasks are allowed to be directed to any of the HSMs in the fleet.

11. The computer-implemented method of claim 10, wherein the fleet of HSMs is provided to perform the cryptography-related tasks as part of a security-related service provided using a set of shared resources.

12. The computer-implemented method of claim 6, wherein the attestation information includes at least one of an expected serial number of the secure hardware device, a challenge question response, or a timestamp within an expected time window.

13. The computer-implemented method of claim 6, wherein the at least one communication address is assigned using a dynamic host configuration protocol (DHCP) server.

14. The computer-implemented method of claim 6, wherein a load balancer is allowed to balance incoming requests across one or more DHCP servers, a number of the one or more DHCP servers allowed to scale over time.

15. The computer-implemented method of claim 6, wherein the secure hardware device includes two communication ports, and wherein a communication address is automatically assigned to each of the two communication ports of the secure hardware device after determining that the attestation information includes one or more expected attestation values.

16. A system, comprising:

a processor; and memory including instructions that, when executed by the processor, cause the system to:

receive a discover packet from a secure hardware device connected to a set of hardware resources;

transmit, in response to receiving the discover packet, a request to the secure hardware device for attestation information;

receive, in response to the request and from the secure hardware device, the attestation information, including at least a predetermined identifier of the secure hardware device and a challenge question response generated by the secure hardware device in response to the request;

determine that the attestation information includes one or more expected attestation values corresponding to the predetermined identifier and the challenge question response;

assign at least one communication address to the secure hardware device; and provision the secure hardware device to receive, using the at least one communication address, requests to perform cryptography-related tasks as part of the set of hardware resources.

17. The system of claim 16, wherein the instructions when executed further cause the system to:

initiate, in response to determining that the attestation information includes one or more expected attestation values, a provisioning workflow for the secure hardware device, the provisioning workflow including configuring the secure hardware device to satisfy one or more requirements for the cryptography-related tasks and providing one or more master keys to the secure hardware device.

18. The system of claim 16, wherein the secure hardware device is a hardware security module (HSM), and wherein the instructions when executed further cause the system to:

adding the HSM to an existing fleet of HSMs, wherein requests to perform the cryptography-related tasks are allowed to be directed to any of the HSMs in the fleet.

19. The system of claim 18, wherein the fleet of HSMs is provided to perform the cryptography-related tasks as part of a security-related service provided using a set of shared resources.

20. The system of claim 16, wherein the attestation information includes at least one of an expected serial number of the secure hardware device, a challenge question response, or a timestamp within an expected time window.

* * * * *